Oct. 29, 1929.                O. TOLMAN                 1,733,286
                            FLUID TRANSMISSION
                          Filed July 25, 1927        2 Sheets-Sheet 2
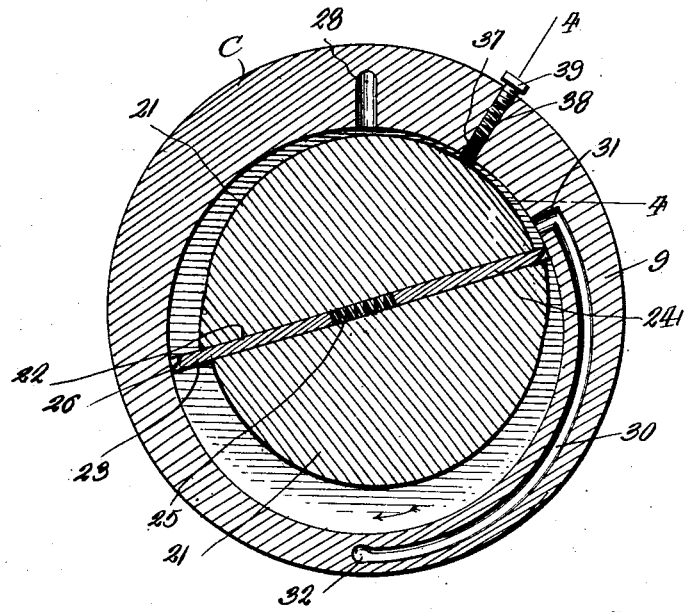
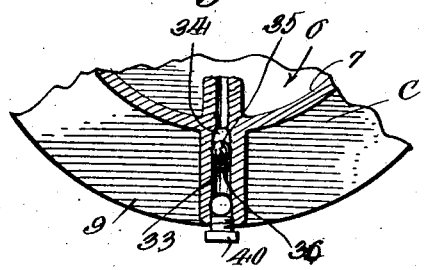
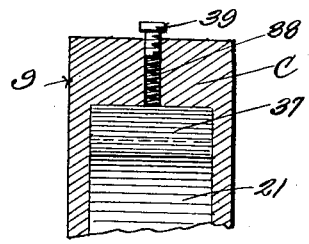
WITNESSES                                    INVENTOR.
                                      OLIVER  TOLMAN
                              BY
                                              ATTORNEY.

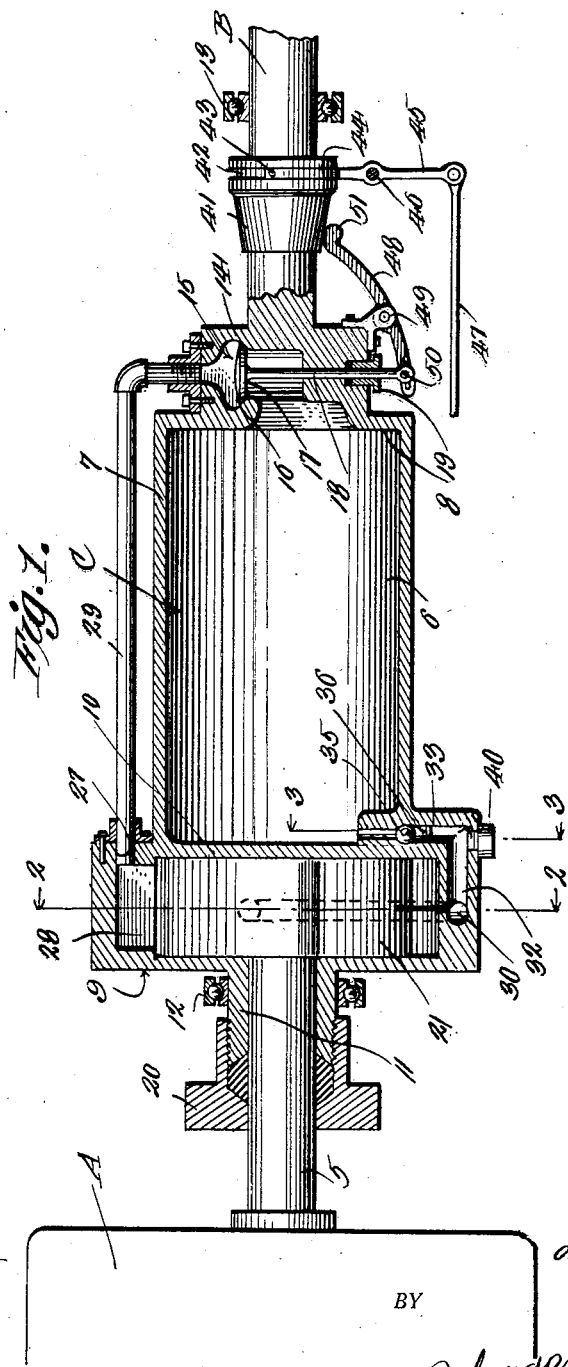

Patented Oct. 29, 1929

1,733,286

UNITED STATES PATENT OFFICE

OLIVER TOLMAN, OF VANCOUVER, BRITISH COLUMBIA, CANADA

FLUID TRANSMISSION

Application filed July 25, 1927. Serial No. 208,360.

This invention relates to gearless transmissions for motor vehicles and the like and one of the primary objects of the present invention is to provide a yielding transmission in which all gears and the like are entirely eliminated between the motor and the propeller shaft, the transmission utilizing a fluid, such as oil, as the power transmitting means.

Another prime object of the invention is the provision of a rotary pump operatively connected with the power plant of a motor vehicle or the like and a casing for the pump rigidly connected with the propeller shaft, with means including the pump for causing the circulating of a fluid, such as oil, around the casing and novel means for controlling the flow of such fluid, so as to regulate the drive between the motor and the propeller shaft.

A further object of the invention is the provision of novel valve mechanism for controlling the flow of fluid and novel means for operating said valve mechanism from a point remote from said transmission.

A further object of the invention is the provision of a novel fluid transmission embodying a novel casing or housing connected directly with the propeller shaft having formed therein the reservoir for receiving the fluid and a body for receiving the rotor wheel connected with the crank shaft of the engine, the body having an outlet connected with one end of the reservoir and an inlet connected with the opposite end of the reservoir, and novel valve means for controlling the flow of the fluid to the rotor so as to govern the driving of the propeller shaft from the prime mover.

A still further object of the invention is to provide an improved fluid transmission of the above character, which will be durable and efficient in use, one that will be simple and easy to manufacture and one which can be incorporated with a motor vehicle at a small cost.

With these and other objects in view, the invention consists in the novel construction, arrangement and formation of parts, as will be hereinafter more specifically described, claimed, and illustrated in the accompanying drawings, in which drawings:

Figure 1 is a longitudinal section through the improved transmission, showing the same connected with a prime mover and a propeller shaft of an automobile.

Figure 2 is a transverse section through the transmission taken on the line 2—2 of Figure 1 looking in the direction of the arrows, illustrating the construction of the rotor, Figure 3 is a detail transverse section taken on the line 3—3 of Figure 1 looking in the direction of the arrows showing the means of incorporating the check valve in the outlet for the rotor, Figure 4 is a detail section in the body of the rotor taken on the line 4—4 of Figure 2 illustrating the means for actuating the vanes of the rotor.

Referring to the drawings in detail, wherein similar reference characters designate corresponding parts throughout the several views, the letter A indicates a prime mover; B a propeller shaft and C the novel transmission connecting the prime mover A with the propeller shaft B.

The prime mover A can be considered of any character or type such as an internal combustion engine and the prime mover has extending rearwardly therefrom the drive or crank shaft 5.

The propeller shaft B is of any desired character and extends rearwardly to the differential of the vehicle and is designed to have any conventional type of reversing gear connected therewith.

The transmission C comprises a fluid reservoir 6 which consists of elongated cylindrical side wall 7 and a rear end wall 8. The forward end of the reservoir is provided with a head 9 of annular construction, which forms a housing as will be later described. It is to be noted, however, that the housing 9 is separated from the reservoir 6 by means of an end or partition wall 10. The forward end of the housing 9 is provided with a bearing sleeve 11 and front and rear bearings 12 and 13 are provided for rotatably supporting the propeller shaft B and the housing and reservoir and it is to be noted that the bearing 12 engages the sleeve, while the bearing 13 engages the propeller shaft.

The rear end of the housing has formed on the end wall 8, a boss 14 provided with a bore 15 which opens into the reservoir 6 and out through one side of the boss. This bore 15 has formed on the side walls thereof a valve seat 16 on which is fitted a poppet valve 17, the stem 18 of which is slidably mounted in the boss 14. This stem is extended through the boss and protrudes radially from the same and is surrounded by a suitable packing box 19 to prevent leakage of fluid around the stem. The rear end of the boss has formed thereon or secured thereto in any desired way the propeller shaft B.

The shaft 5 from the prime mover A extends into the sleeve 11 and is rotatably mounted therein, so that the shaft 5 and the housing 9 with the reservoir 6 rotate independently of one another. The shaft 5 has keyed or otherwise secured thereto the rotor wheel 21 which is arranged within the housing 9 with its opposite faces engaging the end walls of the housing. The rotor wheel 21 is eccentrically disposed within the housing for a purpose which will be later brought out. This rotor wheel 21 in connection with the housing, forms a pump, the purpose of which will also be later described. The rotor wheel 21 is provided with a diametrically extending slot 22 in which is slidably mounted the oppositely extending vanes or blades 23 and 24. These blades are normally urged outward in opposite directions by means of an expansion spring 25 which is arranged in the slot between the said blades or vanes 23 and 24.

The outer ends of the vanes or blades 23 and 24 are oppositely beveled as at 26 to form a knife edge, the purpose of which will be later described. The inner face of the housing 9 directly above the reservoir 6 is provided with an outlet way 27 which communicates with a pocket 28 formed in the inner face of the housing and this pocket communicates with the interior of the housing as clearly shown in Figures 1 and 2. A high pressure return pipe 29 is connected with the outlet 27 and the outer end of the bore 15 formed in the boss 14 as clearly shown in Figure 1 of the drawings. An arcuate way 30 is formed on the side wall of the housing and has communication with the interior of the housing by means of a right angularly extending way 31, at a point spaced from the pocket 28 and the opposite end of this way communicates with a transversely extending way 32 formed in the housing, which in turn communicates with the inwardly directed way 33 which leads to and communicates with the reservoir. A valve seat 34 is formed in the way 33 and a ball check valve 35 is provided for such seat and is held against displacement by means of a pin 36. It can be seen that this valve 35 will move off of the seat under pressure of fluid coming into the pump, but will be held on its seat by any pressure in the pump. The ways 30, 31, 32 and 33 constitute the inlet for the pump.

Disposed between the pocket 28 and the way 31 is arranged a spring pressed blade 37 for engaging the periphery of the rotor wheel, and as shown the blade is normally urged toward the periphery of the wheel by means of an expansion spring 38, which is confined in place by means of a set screw or plug 39. A removable plug 40 is provided for the way 33, which constitutes means for introducing fluid into the reservoir.

In order to operate the control valve 17 a cone collar 41 is slidably mounted upon the shaft B and this cone collar is provided with an annular groove 42, the walls of which are engaged by pins 43 carried by a yoke 44. This yoke is secured to a lever 45 which is rockably mounted on a suitable pivot pin or the like 46. The outer end of the lever 45 has connected thereto a rod 47 which can be at any desired point of the vehicle to facilitate the operation of the cone collar. An arcuate operating lever 48 is rockably mounted at a point intermediate its ends on a suitable bracket 49 carried by the boss 14 and the forward end of the lever is pivotally connected as at 50 to the stem 18 and the valve 17, while the opposite end of the lever is provided with a foot 51 which terminates at the cone collar 41 and is normally engaged by said collar. It is obvious that by operating the rod 47 that the cone collar 41 can be slid on the shaft B which will cause rocking of the lever 48 and the consequent opening and closing of the valve 17. In operation of the improved transmission, the reservoir and housing is filled with suitable fluid, such as oil and upon rotation of the shaft 5, it can be seen that the oil will be forced out through passageway 28, pipe 29, bore 15 and into the cylinder 6. The oil will be drawn in to the pump by the vanes from the reservoir 6 through the passageway 33, way 32, way 30 and way 31.

It is to be noted that during rotation of the rotor wheel 21 that the oil will be caught by the vanes approaching the way or pocket 28 and the spring pressed blade 37 and the vanes will compress and force the fluid into the pocket through the pressure pipe into the bore 15. The knife edge formed on the vanes provides means for intimately engaging the inner face of the housing and the spring pressed blade 37 serves as a projection for forcing the vane in and has means for wiping the vane. It is obvious that as the vane rotates past the blade 37 it will create a suction in rear of the same and thus suck in the oil from the reservoir through the ways 31, 30, 32 and 33. The check valve 34 functions as means for preventing the backing up of the oil back into the reservoir during rotation of the rotor wheel, when the valve 17 is closed or partially closed.

When it is desired to allow the engine to run idle and not drive the propeller shaft B, the valve 17 is opened to its full extent by the cone sleeve 41 and the oil will be permitted to circulate freely back and forth from the reservoir and thus exert no driving influence on the shaft B. However, when it is desired to drive the shaft B it is merely necessary to partially close the valve which will act as means for retarding the flow of oil and thus bring about rotation of the shaft B. The further the valve 17 is moved toward its seat, the more a positive drive is imparted to the shaft B and the faster that the same is rotated. When the valve is entirely upon its seat the circulation of the fluid is stopped and thus the shaft B can be driven at the same speed as the shaft 5.

From the foregoing description, it can be seen that I have provided a novel fluid transmission for motor vehicles in which it is merely necessary to provide means for opening and closing the valve to obtain different speeds, and for bringing about the idling of the engine.

Changes in details may be made without departing from the spirit or scope of this invention, but:

What I claim as new is:

1. A fluid transmission comprising a drive shaft, a propeller shaft, a reservoir for the fluid, means rigidly connecting the reservoir with the propeller shaft for rotation therewith, a housing connected with the reservoir for rotation therewith, a rotor wheel eccentric within the housing and secured to the drive shaft, radially extending spring pressed vanes carried by the rotor wheel engaging the wall of the housing, an inlet port and an outlet port in the housing arranged in spaced relation, a spring pressed blade carried by the housing engaging the periphery of the rotor wheel intermediate the ports, a boss connected with one end of the reservoir having a way therethrough communicating with the reservoir and a valve seat in said way, a valve for the seat, a pressure pipe connecting the outlet port of the housing with said way, ways connecting the inlet port with the reservoir, a check valve in one of said last mentioned ways, and manual means for adjusting the position of the first mentioned valve relative to its seat.

2. A fluid transmission comprising a rotatable reservoir, a housing on one end of the reservoir, a drive shaft extending into the housing and rotatable relative thereto, a rotor wheel secured to the shaft and mounted in the housing, oppositely extending spring pressed vanes carried by the rotor wheel for engaging the inner face of the housing, spaced inlet and outlet ports in said housing communicating with the interior thereof, a spring pressed blade between said ports, a valve casing, a pressure pipe connecting the outlet port of the housing with the valve casing, an inlet port on the housing communicating with the reservoir, a valve stem for the valve extending out of the casing, a propeller shaft secured to said casing, a lever rockably mounted intermediate its ends upon the casing having connection with the valve stem and a cone sleeve slidably mounted upon the propeller shaft for engaging the lever.

3. A fluid transmission comprising a drive shaft, a propeller shaft, a reservoir rigidly connected with the propeller shaft, a housing rigidly connected with the reservoir, a rotor wheel rigidly connected with the drive shaft and rotatably mounted in said housing including radially extending spring pressed vanes, inlet and outlet ports for the housing having communication with the reservoir, a spring pressed blade carried by the housing disposed intermediate said ports, a valve for controlling the flow of fluid through one of said ports, and hand operated means for adjusting the position of the valve.

In testimony whereof I affix my signature.

OLIVER TOLMAN.